United States Patent [11] 3,530,754

[72] Inventor Peter Gabor Kalman,
 51 Compayne Gardens, London NW. 6,
 England
[21] Appl. No. 646,306
[22] Filed June 15, 1967
[45] Patented Sept. 29, 1970
[32] Priority June 20, 1966
[33] Great Britain
[31] 27,457/66

[54] APPARATUS FOR THE INTRODUCTION OF ADDITIVES INTO THERMOMECHANICALLY FORMED PLASTICS ARTICLES
3 Claims, 8 Drawing Figs.
[52] U.S. Cl. ............................................ 83/355, 83/354
[51] Int. Cl. ............................................ B26d 5/20
[50] Field of Search .................................. 83/354, 355, 356, 357, 272, 436, 350

[56] References Cited
UNITED STATES PATENTS
| 1,764,202 | 6/1930 | Dreyfus | 83/355 |
| 2,143,252 | 1/1939 | Kornegg | 83/355X |
| 2,682,135 | 6/1954 | Gladfelter | 83/355X |
| 2,739,647 | 3/1956 | Coste | 83/355 |
| 2,850,421 | 9/1958 | Thompson | 83/356X |
| 3,350,971 | 11/1967 | Schneider | 83/354 |

Primary Examiner—James E. Meister
Attorney—Bacon and Thomas

ABSTRACT: Method and apparatus for introducing an additive into plastic material in the manufacture of plastic articles in which the additive is provided in strand or ribbon form, the strand or ribbon fed to a cutter to be cut into lengths, and the cut lengths added directly to the plastics material at intake to the article manufacturing machine, the rate of feed of the strand or ribbon being controlled to give the desired ratio of additive to plastics material.

Patented Sept. 29, 1970
3,530,754
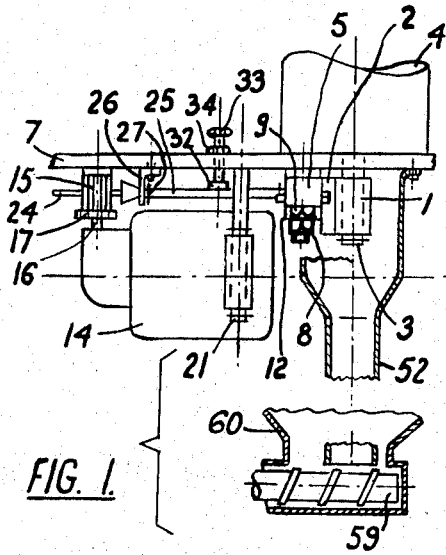
FIG. 1.
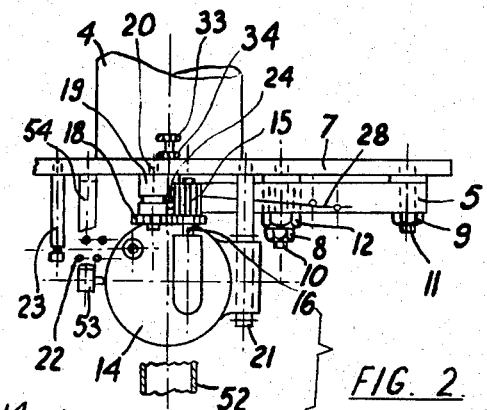
FIG. 2.
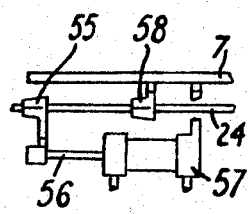
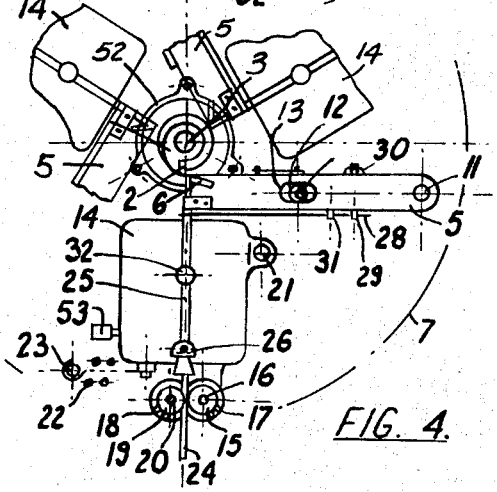
FIG. 3.
FIG. 4.
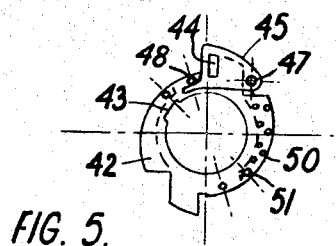
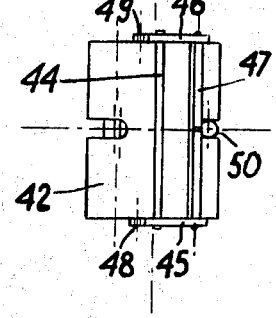
FIG. 5.
FIG. 6.
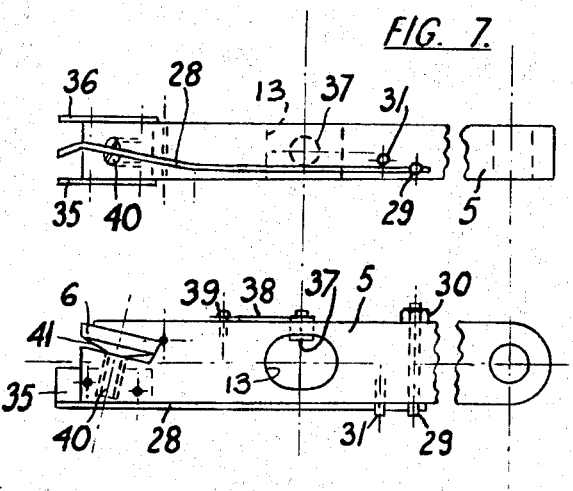
FIG. 7.
FIG. 8.
INVENTOR
PETER GABOR KALMAN
BY
Bacon & Thomas
ATTORNEYS

APPARATUS FOR THE INTRODUCTION OF ADDITIVES INTO THERMOMECHANICALLY FORMED PLASTICS ARTICLES

This invention relates to a method of and apparatus for the introduction of additives into thermomechanically formed plastics articles.

According to known methods of manufacture of thermoplastics articles such as extrusions, mouldings, blow-mouldings and the like a bulk charge of un-colored plastics granules or powder, pre-mixed with coloring and other additives, is introduced into a receptacle forming a part of the moulding machine and the machine automatically draws from this mixture as manufacturing proceeds. As finely powdered color pigments are difficult to confine and often tend to contaminate their surroundings it is often preferred to introduce additives, e.g. coloring matter into the pre-mix in the form of granules of color concentrate, sometimes known as "masterbatch", which are however commercially available in a limited number of colors and granule sizes only. Accordingly, small quantities of concentrate can only be added to the detriment of product consistency since a desired ratio of concentrate to natural plastics of similar particle size in this case involves wider gaps between concentrate granules and the mixing ability of the usual plasticizing equipment (e.g. an extruder screw) is limited. Typically the color concentrate amounts to 3 to 4 percent by weight of the mix and less than 1 percent is not generally acceptable. This rules out the use of standard color concentrates when only slight coloring is desired. Furthermore, non-standard color shades can rarely be achieved by the addition of a number of standard concentrates in granular form in the correct proportions because this would also often involve the use of a color concentrate in small quantities, resulting in uneven coloring. A further disadvantage of adding ingredients in granular form is that concentrates are not usually free of occasional "longs" i.e. rows of granules not fully separated, resulting in fluctuating additive density in the end product which is undesirable in the case of coloring additives, anti-static additives and the like.

The present invention seeks to avoid these disadvantages by continuously metering slices of additive, e.g. color concentrate, cut from long strands of the various additives required to thicknesses which may be made to depend on the proportions of admixture so as to facilitate uniform mixing in the molten zone, directly into the screw or ram of the extruder or moulding machine in adjustable proportions; in the case of coloring additives for example the proportions of admixture are such as to give the desired shade of color. When the invention is employed for metering coloring additives into the screw and hence into the flow of the uncolored plastics material to be tinted the shade of color of the articles being produced and resulting from a particular proportion of admixture can be visually observed and, if need be, speedily altered thus facilitating immediate visual color matching.

Thus according to the invention there is provided a method of introducing an additive into plastics material in the manufacture of plastic articles comprising feeding the additive in strand or ribbon form at a controlled rate to cutting means for cutting the strand or ribbon into lengths and conveying the cut lengths of additive directly to the intake of the article manufacturing machine without intermediate bulk mixing of said plastic material and said additive, the rate of feed of the additive strand or ribbon being controlled to give the desired ratio of additive to plastic material at intake to said machine.

Also according to the invention there is provided apparatus for introducing an additive into plastics material in the manufacture of plastic articles including cutting means for cutting a strand or ribbon of additive into lengths, feeding means for feeding said strand or ribbon at a controllable rate to said cutting means and means for conveying the cut lengths of additive to the intake of a plastic article manufacturing machine.

It will be seen that this method of direct introduction of additives, in sizes appropriate for obtaining an even distribution during the plasticizing process, avoids the necessity of passing the un-colored bulk of the ingredients through the device by means of which the additives are introduced and eliminates the need for pre-mixing devices and is of advantage not only in providing color through the use of color concentrates but also when introducing trace additives for a number of other purposes such as anti-static additives, stabilizers and the like.

A preferred form of apparatus according to the invention comprises a motor-driven cutter provided with one or more feeder units, each feeding a strand of additive, for example color concentrate, to the cutter at an independently variable rate.

FIG. 1 is a side elevational view of a preferred embodiment of the invention;

FIG. 2 is a partial view of FIG. 1 as seen from the left side thereof;

FIG. 3 is a side elevational view of a modified feeder unit;

FIG. 4 is a plan view of the embodiment of FIG. 1, showing multiple feeder units, only one of which is shown complete;

FIG. 5 is a plan view of a preferred form of cutter;

FIG. 6 is a side view of FIG. 5;

FIG. 7 is a side view of an anvil; and

FIG. 8 is a plan view of the anvil of FIG. 7.

With reference to FIGS. 1, 2, 4, 7 and 8 a preferred embodiment of the invention utilizes a rotary cutter 1 keyed to the shaft 3 of an electric motor 4. Around the rotary cutter there are disposed a number of stationary anvils, one of these being shown at 5 provided with cutting blade 6 and fastened to a circular base plate 7 by means of the two nuts 8 and 9, which are in turn screwed down onto studs 10 and 11 secured to the base plate 7. FIG. 4 shows only one feeder unit and anvil completely, others being shown broken away, for ease of illustration, indicating that multiple units are preferably arranged around the cutter 1. Stud 10 carries a hexagon-headed eccentric sleeve 12 whose cylindrical neck is contained within a slot 13 provided in the anvil 5 which it secures so that the spacing between the cutting edges of blade 2 affixed to cutter 1 and blade 6 fastened to anvil 5 depends on the orientation of the eccentric sleeve 12 and is fixed once the nuts 8 and 9 securing anvil 5 are firmly screwed down onto studs 10 and 11 and the hexagonal head of eccentric 12, sandwiched between anvil 5 and nut 8, is immobilized. Associated with each anvil 5 is a variable-speed electric motor 14 with a knurled capstan 15 keyed to its shaft 16 and geared by means of gears 17 and 18 to a grooved pressure roller 19 which is rotatably supported on a stationary spindle 20 screwed into base plate 7. Motor 14 is rotatably hinged about spindle 21 which is in turn screwed into base plate 7 and spring 22, fastened both to motor 14 and spring post 23 also affixed to base plate 7, pulls capstan 15, mounted on the motor shaft, into engagement with pressure roller 19.

A strand of concentrate 24 is gripped between capstan 15 and pressure roller 19, the concerted rotation of which feeds strand 24 to the cutter 1 through a funnel-ended guide tube 25 disposed between capstan 15 and its anvil 5. It will be seen that the feed rate of the strand of additive 24 will depend on the speed of rotation of variable-speed motor 14 and if the cutter 1 rotates at a uniform speed then the thicknesses of the slices of additive cut will depend on the feed rate, the additive being cut into comparatively coarse lengths when the feed rate is fast and fine cutting being achieved when the additive is metered-in in small amounts only as is desirable if an even dispersion of the additive during subsequent plasticizing is to be achieved.

When additives of particularly abrasive nature are processed it becomes advantageous to provide cutter 1 with more than one cutting blade whilst correspondingly reducing its speed of rotation so as to minimize wear at the cutting edges and blade life can also be extended by staggering the cutting positions of the various strands along the axis of rotation of the cutter, so as to provide an adequately wide axial zone for each strand within which its cutting position may be set arbitrarily. Such an arrangement permits the employment of wide cutting blades the entire width of which may be fully utilized before the blades require replacement or re-sharpening. In the embodiment described this useful feature is provided by allowing the end of guide tube 25 to be manually aligned with any arbitrary part of the cutting edge of blade 6 adjoining it. Guide tube 25 is secured to base plate 7 by means of bracket 26 which is located between the enlarged funnel-end of tube 25 and circle 27 affixed to tube 25, so that tube 25 cannot move along its axis but it may pivot within the oversize hole in bracket 26. A spring wire 28, secured to anvil 5 by passing through a hole in stud 29 which is in turn secured to anvil 5 by means of nut 30, bears against one end of guide tube 25. The protruding end of spring wire 28 is bent as shown in FIG. 7 and the wire is deflected by passing under pin 31; thus as it bears against guide tube 25 the latter is urged into contact with anvil 5 and simultaneously disc 32, rigidly affixed to tube 25, is pressed against the knurled-head screw 33 secured to base plate 7 adjustable by means of the knurled nut 34. It will be seen that by turning screw 33 guide tube 25 and the strand of additive 24 which it carries may be made to traverse the cutting edge of anvil blade 6, this travel being limited by end-plates 35 and 36 affixed to anvil 5.

Staggering of the cutting positions of the various additives along the axis of the cutter 1 has further advantages when additives are introduced in widely different proportions; by providing a greater number of cutting blades at the axial zones within which the major constituents are cut and fewer blades at the axial zones corresponding to the minor constituents excessive differences in the lengths of the slices of the various constituents may be avoided. An overall adjustment of the cut lengths of all the additives may be simultaneously obtained by varying the speed of rotation of the cutter, for example through the use of a variable-speed cutter motor 4. It was also found advantageous to provide cutter 1 as well as the anvils such as 5 against which it operates with interchangeable blades made of a suitably hard and abrasion resistant material such as, for example, tungsten carbide clamped securely to cutter and anvils respectively in a manner facilitating easy and quick replacement. The separation between cutter and anvil blade edges may be set, for example, in the manner described using eccentric sleeves such as 12 to locate each anvil, to a suitable distance which was found to be between 0.001" and 0.008" depending on the stiffness of the strand of additive being cut; a typical separation being 0.004".

One preferred embodiment of an anvil well suited for accurate setting and adapted for easy replacement of its blade as is preferred when the invention is put into practice is shown in FIGS. 7 and 8. Anvil 5, carrying spring wire 28 and end-plates 35 and 36 as already described, is provided with a slot 13 which is slightly wider than the neck of eccentric 12 shown in FIGS. 12 and 4. A pressure pad 37, riveted to leaf spring 38 which is in turn secured to anvil 5 by screw 39, protrudes into this slot through a transverse hole cut into anvil 5 and serves to eliminate any backlash between anvil 5 and the eccentric 12. The frusto-pyramidal tungsten carbide blade 6 is clamped into an open slot provided in anvil 5 by a grubscrew 40 through the medium of disc-spring 41 so as to assure a firm shakeproof grip.

One preferred embodiment of a cutter in accordance with the invention, capable of supporting two diagonally opposed cutting blades, is shown in FIGS. 5 and 6; only one blade and its clamping arrangement being shown for clarity. Cutter body 42 is provided with keyway 43 facilitating the affixing of the cutter to motor shaft 3 and carries two blades, only one of which is shown at 44. A saddle formed by sideplates 45 and 46 riveted onto crossbar 47 is hooked under pins 48 and 49 and clamps blade 44 against the cutter body 42 owing to the action of spring 50, one end of which is hooked onto crossbar 47 and the other secured to cutter body 42 by means of a pin 51 passing through the slot housing the spring.

It was found beneficial in some cases to provide apparatus in accordance with the invention with means for giving an alarm signal, such as a light or sound signal, to give warning when a strand of additive has come to an end. With reference to FIGS. 2 and 4, there is provided a microswitch 53, suitable for actuating an electric bell or lamp, affixed to bracket 54 which is in turn fastened to base plate 7. This switch bears against the hinged feeder motor 14 and is arranged to actuate an alarm when, there being no strand of additive between capstan 15 and pressure roller 19, motor 14 is urged by spring 22 to swing against microswitch 53 actuating its contacts.

It was found that a satisfactory feeder shown in FIG. 3, which may be used in the place of motor 14, capstan 15 and roller 19 in the embodiment shown in FIGS. 1, 2 and 4 could be constructed by affixing a slit collet chuck 55 to the reciprocating piston 5, 6 of a pneumatic cylinder 57; by threading the strand of additive 24 through this collet chuck and also through a second similar chuck 58 rigidly affixed to base plate 7 and disposed so as to grip the strand likewise to the reciprocating one intermittent feeding of strand 24 was secured at a rate which was readily variable by controlling the reciprocation of the cylinder.

The slices of additive cut between the rotary cutter 1 and the anvils, such as 5, disposed around it fall into a funnel 52 which surrounds the cutter and ends in a tube leading to the screw feed 59 (shown in FIG. 1 only) of an injection moulding machine, extruder or the like fed from a hopper 60. The slices may be metered into the flights of the screw of this machine either through a hole in the casing surrounding the screw or by leading the tube carrying them to the screw through the hopper which contains the uncolored bulk of the plastics material to be processed; in the latter case care must be taken to ensure that the exit end of the tube is in the vicinity of the screw so that the slices of additive are carried into the melt by the screw and do not accumulate in the hopper; any such tendency towards accumulation may if experienced, be counteracted through the use of a motor-driven impeller.

It is to be understood that the invention is not limited to embodiments in which the cutting stations are substantially helically distributed as in the example given and it will be obvious that other than electrically or pneumatically variable means may be utilized for driving the cutter or the feeders; these may, for example, be driven from a common motor through separate linkages having independently adjustable forwarding characteristics or from separate hydraulic or hydro-pneumatic cylinders, motors or by other driving means provided only that the feeding rates to the various cutting stations are variable at will independently from one another.

I claim:

1. Apparatus for introducing an additive into plastics material in the manufacture of plastic articles including cutting means for cutting a strand or ribbon of additive into lengths, feeding means for feeding said strand or ribbon at a controllable rate to said cutting means and means for conveying the cut lengths of additive to the intake of a plastic article manufacturing machine, said feeding means comprising two feeding means for feeding at least two strands or ribbons of additive at independently controllable rates, said feeding means cooperating with a single cutting means.

2. Apparatus as claimed in claim 1 wherein said cutting means is a rotary cutter having at least one cutting blade working in conjunction with at least two cutting anvils, each said feeding means serving to feed its strand or ribbon to one anvil.

3. Apparatus as claimed in claim 2 wherein each said feeding means includes means for adjusting the strand or ribbon axially of the blade of said rotary cutter.